July 24, 1928.  F. O. HOAGLAND  1,678,290
ADJUSTABLE SNAP GAUGE
Filed Oct. 14, 1926
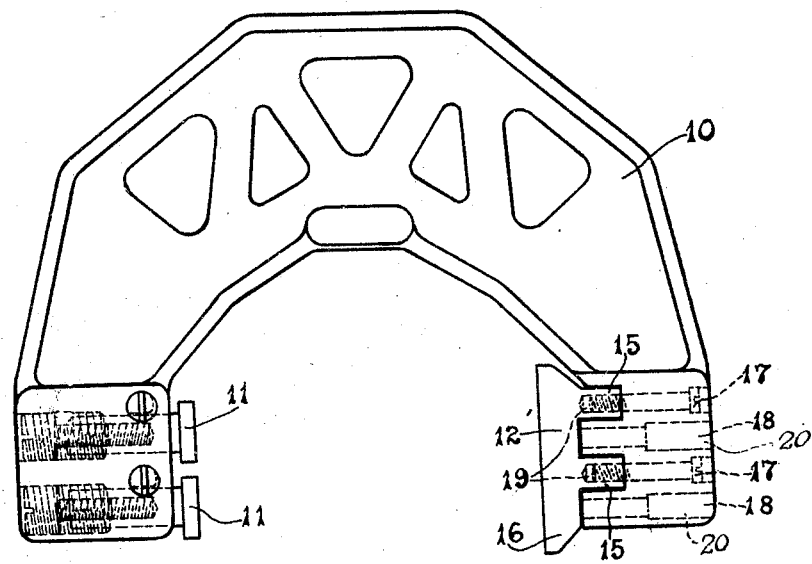
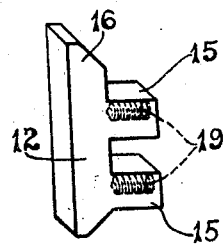
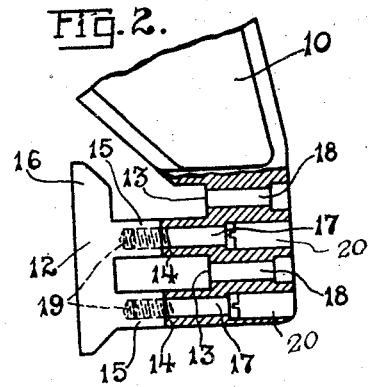
INVENTOR
F. O. Hoagland
BY
Joseph K. Schofield
ATTORNEY Patented July 24, 1928.

1,678,290

UNITED STATES PATENT OFFICE.

FRANK O. HOAGLAND, OF BRIDGEPORT, CONNECTICUT, ASSIGNOR TO PRATT & WHITNEY COMPANY, OF NEW YORK, N. Y., A CORPORATION OF NEW JERSEY.

ADJUSTABLE SNAP GAUGE.

Application filed October 14, 1926. Serial No. 141,659.

This invention relates to snap or limit gauges and particularly to a gauge of this type having preferably a pair of parallel anvils at one side of a frame and an anvil plate adapted to cooperate therewith positioned upon the opposite side of the frame.

An object of the present invention is to provide means for positioning an anvil plate for a snap or limit gauge in two spaced or adjusted positions toward the anvils on the opposite side of the frame so that the range of measurements for any one gauge frame may be greatly increased beyond the adjustments provided for the anvils on one side.

Another object of the invention is to provide an anvil plate for a snap gauge adapted to be positioned in two spaced positions in the frame by means of the same securing means and without the employment of an intermediate member.

Another object of the invention is to provide an improved form of anvil plate for snap gauges having projections upon its rear surface and adapted to be placed in either of two spaced positions upon an arm of the gauge frame suitably formed to engage the anvil plate in either position.

With these and other objects in view, my invention consists in the features of construction and operation set forth in the following specification and illustrated in the accompanying drawing.

In the accompanying drawing annexed hereto and forming a part of this specification, I have shown my invention embodied in a typical form of snap or limit gauge having two parallel adjustable anvils on one side, but it will be understood that the invention can be otherwise embodied and that the drawings are not to be construed as defining or limiting the scope of the invention, the claims appended to this specification being relied upon for that purpose.

In the drawing:

Figure 1 is a side view of a complete snap gauge provided with the present invention, the anvil plate being shown in one of its operative positions.

Fig. 2 is a fragmentary view partly in section, showing the anvil plate in its other operative position.

Fig. 3 is a separate isometric view of the anvil plate.

In the above mentioned drawing I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a gauge frame; second, one or more adjustable anvils mounted within one arm of the frame; third, an anvil plate mounted within the opposite arm of the gauge frame; fourth, spaced projections formed on one side of the gauge frame; fifth, projections on the rear surface of the anvil plate; sixth, means for securing the anvil plate in position upon the gauge frame with the projections on the gauge frame and plate in opposed relation or in interposed relation.

Referring more in detail to the figures of the drawing, I show at 10 a typical form of gauge frame having upon one arm adjustably positioned anvils 11. Two of these anvils 11 are provided disposed parallelly with each other and adapted to be independently adjusted toward and from the opposite arm of the frame 10 by means of screws abutting their outer ends so that they may be set for slightly different dimensions. These anvils may be of any usual or conventional type. On the opposite side or arm of the gauge frame 10 is an anvil plate 12 directly opposed to the anvils 11 upon the first side of the frame.

As there is a limit to the adjustments possible with the anvils 11 it is desirable to have means for positioning the anvil plate 12 in two spaced positions relative to the opposite arm of the frame 10 so that the range of adjustments for any one gauge frame 10 may be materially increased. Preferably no fine or close adjustment of this anvil plate 12 is provided, as these adjustments can be effected most easily by the individual anvils 11. It is only necessary to provide securing means for the anvil plate 12 in two rather widely different positions. For this purpose the gauge frame 10 on the side adapted to receive the anvil plate 12 is provided with recesses 13 forming two projections 14 extending directly toward the opposite side of the frame 10. The anvil plate 12 upon its inner face is carefully finished to provide a gauging surface and upon its rear face is provided with two projections 15 slightly longer than the corresponding projections 14 formed on the anvil frame 10. Also, as shown in the figures of the drawing, the projections 15 upon the anvil plate 12 are closer to one end of the plate 12 than the other, leaving upon one end a laterally extending portion 16.

To adjust the gauge for its maximum dimension, the anvil plate 12 is positioned as shown in Fig. 1, with the projections 15 upon the anvil plate 12 interposed between the projections 14 on the gauge frame 10, so that the outer surfaces of the projections 15 on the anvil plate 12 engage the bottom surfaces of the recesses 13 formed within the gauge frame 10. In order to position the anvil plate 12 for shorter distances between the anvils 11 and plate 12, the anvil plate 12 is turned end for end and the outer ends of the projections 15 on the anvil plate 12 engage the end surfaces of the projections 14 formed on the gauge frame 10.

To secure the anvil plate 12 in either of its operative positions, screws 17 are provided extending through openings 18 within the frame 10 and entering threaded holes 19 within the projections 15 of the anvil plate 12. For convenience the openings in the gauge frame 10 extending to the inner ends of the projections 14 are countersunk as shown at 20 to a greater depth than those extending to the bottom of the recesses 13 so that the same length of screws 17 can be used for securing the anvil plate 12 rigidly in either of its operative positions.

What I claim is:

1. A snap gauge comprising in combination, a gauge frame, a pair of parallel adjustable anvils within said frame, an anvil plate opposed to said anvils, projections on said anvil plate, projections on said frame, and means to secure said anvil plate to said frame by said projections upon or between said projections on the frame.

2. A snap gauge comprising in combination, a gauge frame, a pair of parallel adjustable anvils within said frame, an anvil plate opposed to said anvils, projections on said anvil plate, and means entering said projections to secure said anvil plate to said frame in either of two spaced positions.

3. A snap gauge comprising in combination, a gauge frame, a pair of parallel adjustable anvils within said frame, an anvil plate opposed to said anvils, projections on said anvil plate, and screws passing through said frame and entering said projections to secure said anvil plate to said frame in either of two spaced positions.

4. A snap gauge comprising in combination, a frame, a pair of parallel adjustable anvils within said frame, an anvil plate opposed to said anvils, spaced projections on said gauge frame, spaced projections on said anvil plate, and means to secure said anvil plate to said frame with said projections in directly opposed relation to each other or with said projections interposed between each other.

5. A snap gauge comprising in combination, a frame, a pair of parallel adjustable anvils within said frame, an anvil plate opposed to said anvils, spaced projections on said gauge frame, spaced projections on said plate, and mean entering said projections on said anvil plate to secure said plate to said frame with said projections in opposed relation to each other or with said projections interposed between each other.

6. A snap gauge comprising in combination, a frame, a pair of parallel adjustable anvils within said frame, an anvil plate opposed to said anvils, spaced projections on said gauge frame, spaced projections on said plate, and means to secure said plate to said frame with said projections in opposed relation to each other or in a position reversed end for end and with said projections interposed between each other.

In testimony whereof, I hereto affix my signature.

FRANK O. HOAGLAND.